May 18, 1954  J. HALTENBERGER  2,678,681
AUTOMOTIVE SEAT ADJUSTMENT
Filed Aug. 4, 1952

INVENTOR
Jules Haltenberger
ATTORNEY

Patented May 18, 1954

2,678,681

UNITED STATES PATENT OFFICE 2,678,681

AUTOMOTIVE SEAT ADJUSTMENT

Jules Haltenberger, Rancho Santa Fe, Calif.

Application August 4, 1952, Serial No. 302,584

2 Claims. (Cl. 155—14)

The present invention relates to motor vehicle independent seat adjustment.

All present day automobiles, that applicant is aware of, provide parallel acting forward and rearwardly front seat adjustment. These seats are wide and are becoming wider; their very carefully determined depth remains the same. They are acceptable for a human of average conformation, but they are not deep enough for a man of large stature, and they are now too deep for women, children and people of some races.

In many instances the seat can be adjusted to be comfortable for the driver, but not the passenger, and vice versa. In some cases the driver needs a forwardly adjusted seat but the seat per se is too deep for comfort and safety, whereas the passenger desires much more room, and vice versa.

To provide an automobile seat for the comfort and safety for all, it is here proposed, and it is the object of my invention, to provide an automobile front seat with a usual parallel forward and backwardly seat adjustment, and to provide on such seat a fore and aft backrest adjustment, selectively applicable to either end of the seat backrest, for diagonal backrest adjustment or when similarly adjusting both ends, for parallel backrest adjustment.

A further object is, to provide a selective backrest adjustment that is applicable to the automobile seats now in use or in production.

Further objects will appear as the description proceeds.

Figure 1:
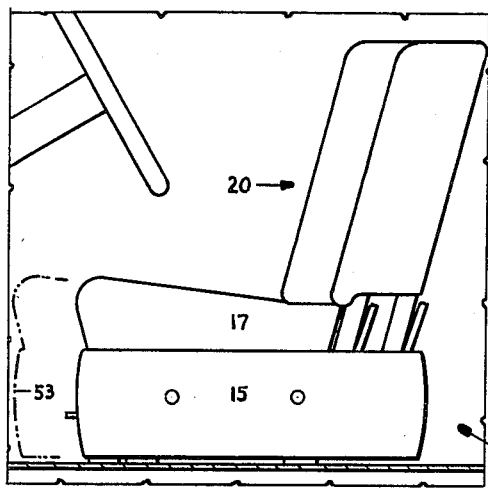
Figure 2:
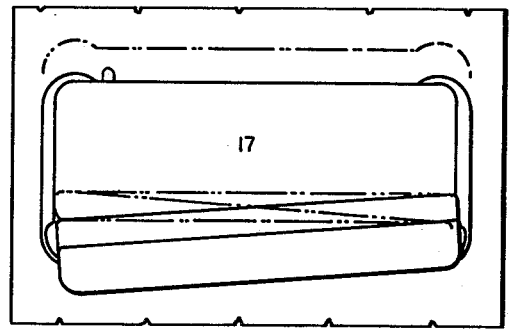
Figures 3, 4:
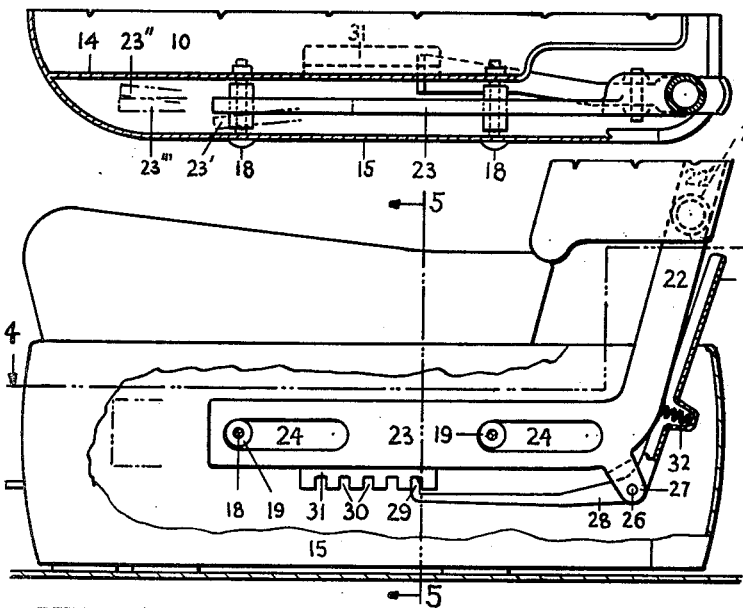
Figure 5:
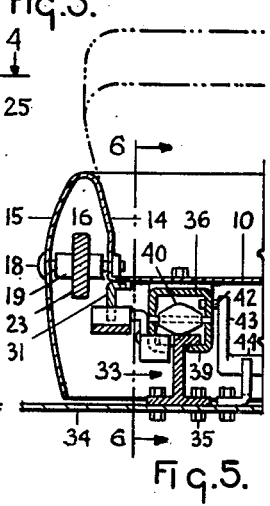
Figure 6:
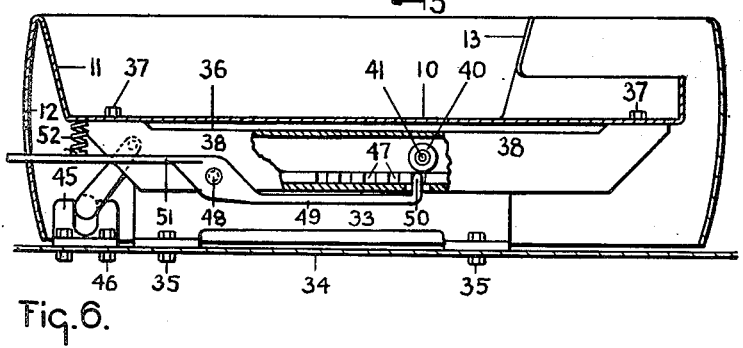

Fig. 1 illustrates an automobile elongated front seat transversely disposed in an automobile, the seat is shown at the extreme rearward adjusted position, the associated elongated backrest driver's end at extreme aft, and the passenger's end in extreme fore adjusted position; Fig. 2 is a top elevation of Fig. 1, in a somewhat smaller scale; Fig. 3 is the lower part of the seat shown in Fig. 1 with parts broken away, here shown in a larger scale and the backrest at extreme aft position at both ends; Fig. 4 is a section substantially on line 4—4 of Fig. 3; Fig. 5 is a section substantially on line 5—5 of Fig. 3; Fig. 6 is a section substantially on line 6—6 of Fig. 5.

Referring to Figs. 1 to 6 inclusive, it will be seen that the main part of an automobile front seat supporting hollow structure, generally indicated at 9, is composed of a seat tray 10 having a seat cushion locating front wall 11 and associated seat front wall 12. The tray is provided with a cushion locating rear wall 13, side walls 14 and therewith integral seat end walls 15, walls 14 and 15 form tunnels 16 at each end of the seat structure, the tray 10 and associated parts support a usual seat cushion 17. Walls 14 and 15 are interconnected by bolts 18, serving as bearings for rollers 19, arranged to support an elongated backrest generally indicated at 20 for selective backrest end adjustment (to be described).

Backrest 20 has a usual backrest ends interconnecting master tubular structure member 21 having integral depending exposed legs 22 terminating in integral forwardly extending arms 23. Leg 22 as here shown has a generally upstanding continuation for the adoption of a usual resilient cushion trimming.

Both arms are alike (only the driver's end one is shown). The arm is pierced by two elongated openings 24. The lengths of these openings are determined by the desired seatback end extreme fore and aft adjustment, the width of these openings are slightly larger than the outside diameter of the rollers 19, to assure free sliding of the arm and associated backrest end on the respective pair of backrest supporting rollers. These rollers in these openings, form a guide means for the arm and backrest respectively.

It will be noted, that the tunnel is much wider than the thickness of the arm. This clearance is provided to permit selective fore and aft adjustment of either end of the backrest without interference. When the driver's end of the backrest is in aft position, as shown in Fig. 3, should the passenger's end be adjusted to extreme fore position, as shown in Fig. 1, then the terminal end of the driver's end arm will take a lateral position indicated by chain lines at 23'. At reversed seatback adjustment, the terminal end will take the position indicated at 23". When both backrest ends are adjusted to extreme fore position, the arm terminal end will move to the indicated central position 23'''.

Figs. 1, 2 and 3 show the driver's end of the backrest in extreme aft position, secured there by a simple releasable lock mechanism. This is composed of an accessible generally upstanding manually controlled release lever a locking means release 25, normally in spaced relation and adjacent to leg 22, arranged to operate on fulcrum pin 26 carried by prongs 27 on the arm. Integral with the release lever is a forwardly extending lever 28 terminating in pawl 29, here shown while engaging the rear one of many backrest end adjusted position locking notches 30. These notches are formed in the depending part of an angle piece 31, with its upper surface secured to the tray bottom surface as by spot welding. The pawl is releasably held in engagement with the indicated notch, by spring 32 shown caged in the release lever.

In operation, forward pressure on the release lever will disengage the locking pawl, therefore by one hand grip of the leg the release arm is forced to the leg, and that backrest end becomes adjustable fore and aft. Upon finding the desired adjusted position, by releasing the leg the pawl will lock the seat in a new position. This operation can be conveniently performed while the adjustor stands by the automobile when the adjustor desires to increase the ingress space in a two door automobile or when the adjustor rides in it. All seat cushion corners are curved, the curve on the respective seat rear corners provides sufficient room for a hand when closed around a leg.

The backrest tubular master member 21 is integral with each depending leg and they terminate in forwardly extending arms, this unit is arranged for selective backrest end adjustment. One end of backrest adjustment results in a diagonal backrest position, when both ends are similarly adjusted, a parallel adjustment is arrived at.

Hereinabove applicant described the selective backrest adjustment in relation to the seat. As shown on the drawings, the seat as a unit is forward and backwardly adjustable in relation to the automobile, in parallel movements. Parallel seat adjustment is not new with the applicant, and as far as he is aware of, every automobile has a seat rack under the driver and passenger end for this purpose. All of them incorporating identical main elements, namely a stationary member and a telescopically slidable member thereon, and interconnecting means to force both sliding members to slide at the same time. For simplicity of presentation applicant illustrates the main elements, and believes a brief description will suffice.

The seat tray and associated parts are supported by a pair of forward and backwardly adjustable identical seat racks, excepting, the passenger end seat rack omits the seat position locking mechanism. In Fig. 5, only the driver's end rack is shown.

The seat rack mechanism comprises an I-beam section member, having notches along the upper edge of said member, generally indicated at 33, and is secured to the usual floor 34 as by bolts 35. The stationary member slidably supports a sliding telescoping member having a top wall 36, terminating in higher level tray contacting ledges for the adoption of tray and seat securing cap screws 37. The top wall is formed into side walls 38, having bottom inturned edges 39 arranged to slide under each arm of the upper T of the stationary I member. The weight of the seat and passengers is transferred to the top of the stationary member, by roller 40 operating on pin 41 secured in the sliding member side walls. The two associated identical sliding members are identically interconnected by an operating device to compel both sliding elements to slide at the same time the same amount. This device provides, that the driver's end sliding element inner side wall is operatively engaged by a protruding pin 42, a part of a lever 43, a part of a torsion bar 44. This bar is free to turn and operate in a U bracket 45 secured to the floor as by bolts 46.

Inasmuch, as by the torsion interconnecting action the sliding element movements coincide, only the driver's end seat rack needs to be provided with a seat adjustment releasably locking mechanism. As indicated in Figs. 5 and 6, for a short length the stationary member top T left arm as viewed in Fig. 5, is provided with seat position locking notches 47. Side wall 38 as by screw 48 operatively supports a notch engaging lever 49 terminating in pawl 50, here shown in seat rearward adjusted locked position. The engaging lever forwardly terminates in operating lever 51, having locked position urging spring 52. By lifting the end of the operating lever the seat becomes forward and backwardly adjustable in parallel, in the usual manner. In Fig. 1 chain line 53 indicates the seat in extreme forwardly adjusted position.

With the here presented invention, automobile manufacturers will be able to increase the depth of their front seats to accommodate not only medium but large passengers. For medium ones the backrest can be adjusted forwardly, and if one of them is much smaller than the other, then by diagonal backrest adjustment.

The seat as a whole is adjustable forwardly and backwardly, therefore all passenger size combinations can be met for comfort and safety.

In this presentation, the seat per se, is shown for parallel adjustment, for certain applications I might provide the seat with parallel and also diagonal seat adjustment as disclosed in my copending patent application Ser. No. 64,208, filed December 8, 1948, for Motor Vehicle Independent Seat Control, and Ser. No. 145,857, filed February 23, 1950, for Automobile Electric Independent Seat Adjustment.

While I have herein shown and described only certain specific embodiments of my invention and have suggested only certain possible modifications, it will be appreciated that many changes and variations can be made to suit particular conditions and embodiments of use, without departing from the spirit and scope of my invention.

What applicant claims as his invention:

1. In a vehicle a floor and a seat of a depth and a width for at least two passengers, comprising a seat supporting hollow structure, forwardly and backwardly constantly parallel adjusting means including a releasable adjusted position lock operatively disposed between said floor and structure, an elongated backrest having at each end a depending leg and therewith integral forwardly extending arm operatively supported by said hollow structure for selective fore and aft adjustment of each end of said backrest, whereby upon equal fore adjustment of each end of said backrest, as related to said structure, the whole useful depth of said seat is materially reduced while also permitting the diagonal adjustment of said backrest, and releasable backrest adjusted position locking means disposed between said structure and each end of said backrest.

2. The invention disclosed in claim 1, wherein both the backrest adjusted position locking means releases are disposed adjacent to their respective backrest legs.

References Cited in the file of this patent

UNITED STATES PATENTS

| Number | Name | Date |
|---|---|---|
| 1,519,824 | De Veau | Dec. 16, 1924 |
| 1,685,770 | Bowen | Oct. 2, 1928 |
| 2,276,373 | Cox | Mar. 17, 1942 |
| 2,563,220 | Doty | Aug. 7, 1951 |
| 2,618,312 | Bradley | Nov. 18, 1952 |

FOREIGN PATENTS

| Number | Country | Date |
|---|---|---|
| 507,678 | Great Britain | June 20, 1939 |